United States Patent [19]

Kushi et al.

[11] Patent Number: 5,067,579
[45] Date of Patent: Nov. 26, 1991

[54] SLIP CONTROL SYSTEM FOR A VEHICLE PROVIDED WITH AN INTERNAL COMBUSTION ENGINE

[75] Inventors: Naoto Kushi; Toshio Takaoka; Motoyasu Muramatsu, all of Toyota, Japan

[73] Assignee: Toyota Jidosha Kabushiki Kaisha, Toyota, Japan

[21] Appl. No.: 484,865

[22] Filed: Feb. 26, 1990

[30] Foreign Application Priority Data

Mar. 2, 1989 [JP] Japan .................................. 1-50843
Aug. 8, 1989 [JP] Japan ................................ 1-205398

[51] Int. Cl.⁵ .......................................... B60K 28/16
[52] U.S. Cl. ............................. 180/197; 364/426.03
[58] Field of Search .................. 180/197; 364/426.03

[56] References Cited

U.S. PATENT DOCUMENTS

| | | | |
|---|---|---|---|
| 3,938,612 | 2/1976 | Boudeville et al. | 180/197 |
| 4,432,430 | 2/1984 | Lind et al. | 180/197 |
| 4,721,176 | 1/1988 | Kabasin et al. | 180/197 |
| 4,736,728 | 4/1988 | Takahashi et al. | 180/197 |
| 4,745,987 | 5/1988 | Buschmann | 180/197 |
| 4,917,208 | 4/1990 | Komoda | 180/197 |

FOREIGN PATENT DOCUMENTS 0295134 12/1986 Japan ................................ 180/197
62-67257 3/1987 Japan .

Primary Examiner—Charles A. Marmor
Assistant Examiner—Mitchell Bompey
Attorney, Agent, or Firm—Kenyon & Kenyon

[57] ABSTRACT

A slip control system for a vehicle provided with an internal combustion engine having a knocking control system for controlling an ignition timing retarding amount in accordance with a degree of knocking detected by a knocking sensor mounted on a body of the engine. The slip control system controls the torque applied to drive wheels of the vehicle in accordance with a degree of slip generated at the drive wheels. A circuit is provided for cancelling the operation of the knocking control system during the operation of the slip control system.

5 Claims, 11 Drawing Sheets

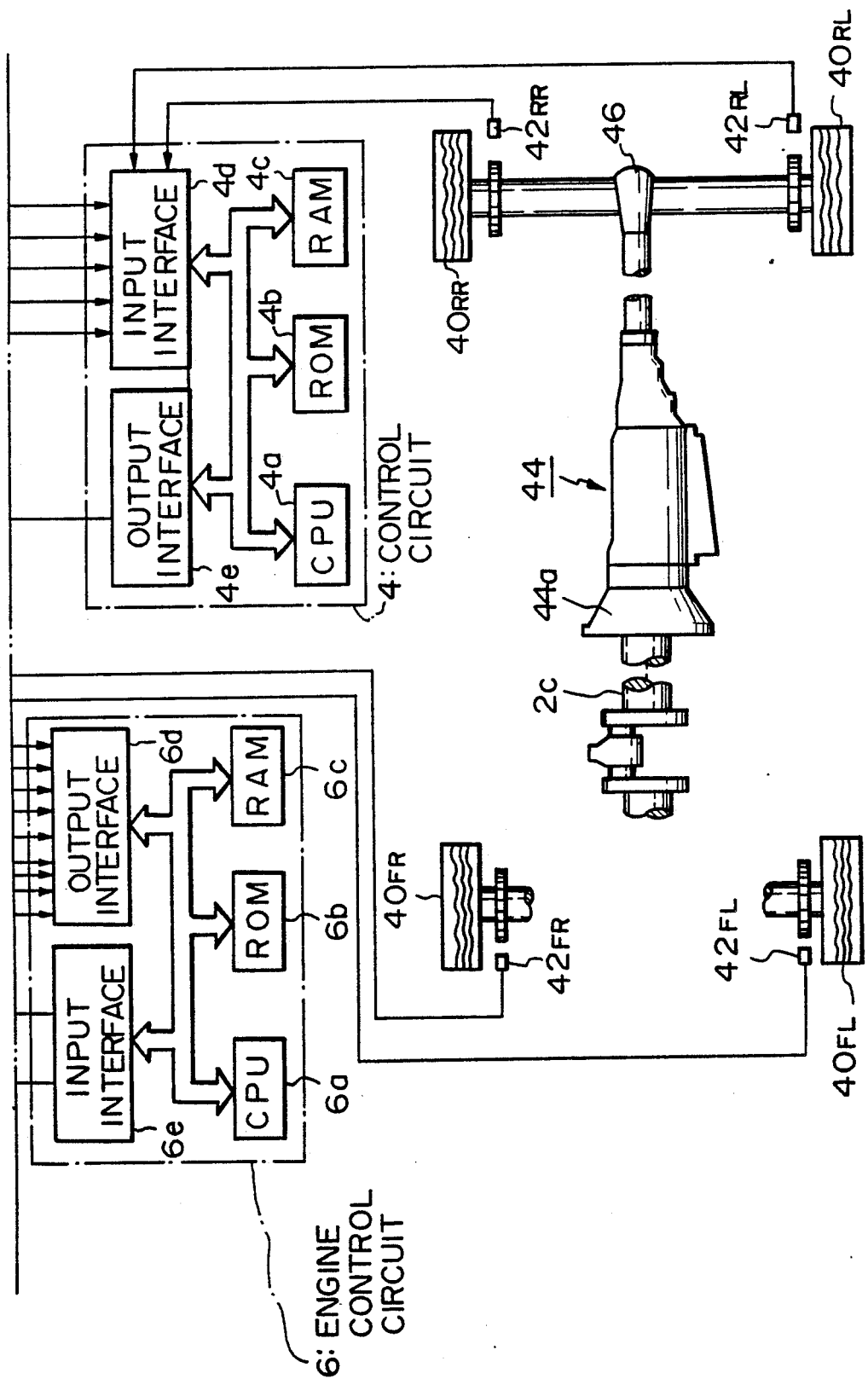

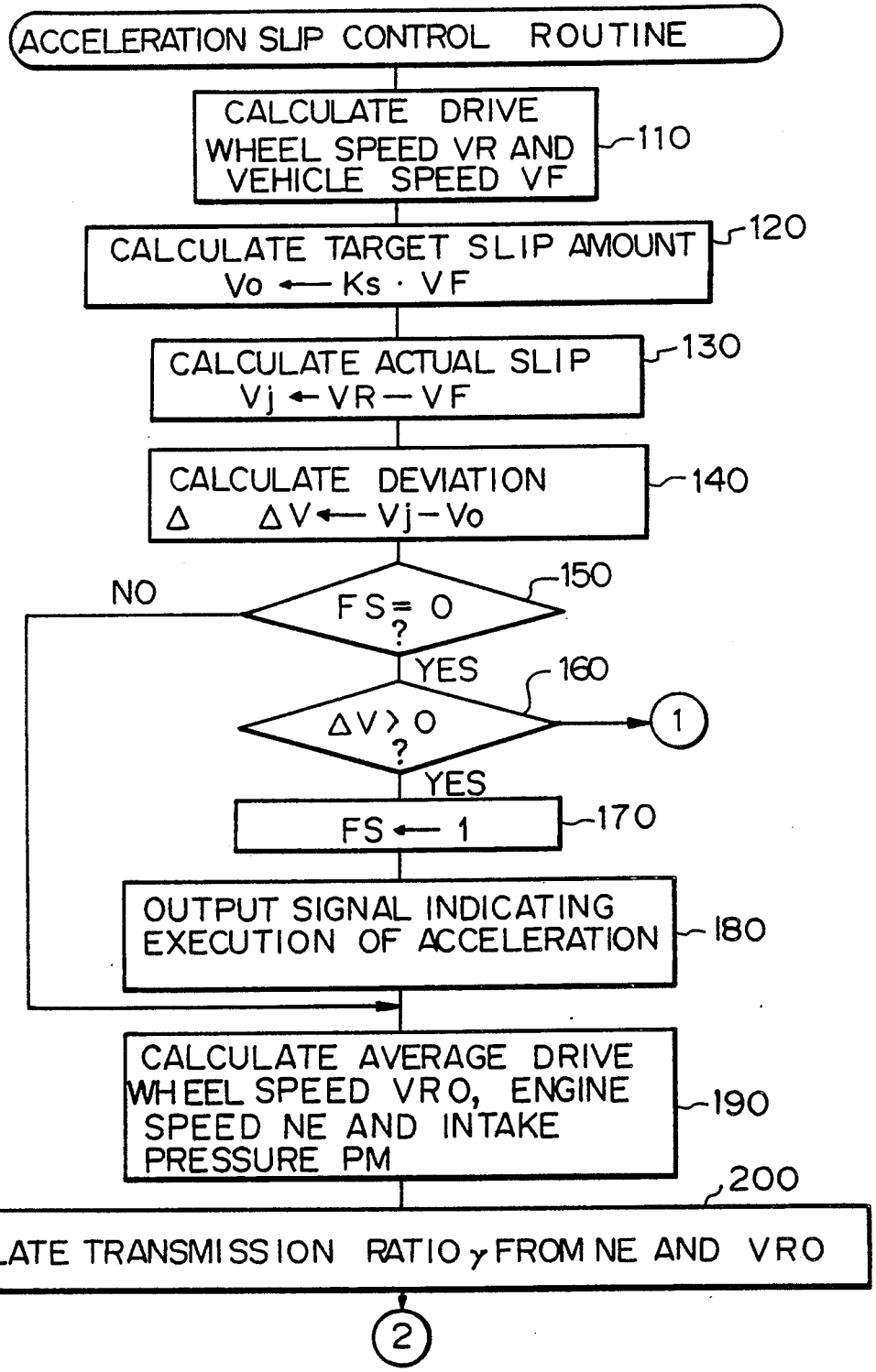

Fig.2B (2)

210 — CALCULATE INTEGRAL TERM TSI OF TARGET DRIVE WHEEL TORQUE
$TSI \leftarrow TSI - GI \cdot \Delta V$

220 — CALCULATE PROPORTIONAL TERM TSP OF TARGET DRIVE WHEEL TORQUE
$TPS \leftarrow -GP \cdot \Delta V$

230 — CALCULATE TARGET DRIVE WHEEL TORQUE TS
$TS \leftarrow TSP + TSI$

240 — CALCULATE TARGET ENGINE TORQUE TE
$TE \leftarrow TS/\gamma$

250 — CALCULATE MAXIMUM
$TMAX \leftarrow f(PM \cdot NE)$

260 — CALCULATE NUMBER OF CYLINDER FOR FUEL CUT DURING ACCELERATION SLIP CONTROL
$NC \leftarrow INT\left\{KC\left(1 - \dfrac{TE}{TMAX}\right)\right\}$

270 — CALCULATE TORQUE REDUCTION RATIO BY RETARDING OF IGNITION TIMING TCA
$TCA \leftarrow f(PM, NE)$

280 — CALCULATE DELAY AMOUNT $\Delta\theta S$ DURING ACCELERATION SLIP
$\Delta\theta S \leftarrow \left\{1 - \dfrac{TE}{TMAX} \cdot \dfrac{KC}{KC - NC}\right\} \cdot \dfrac{1}{TCA}$ (3)

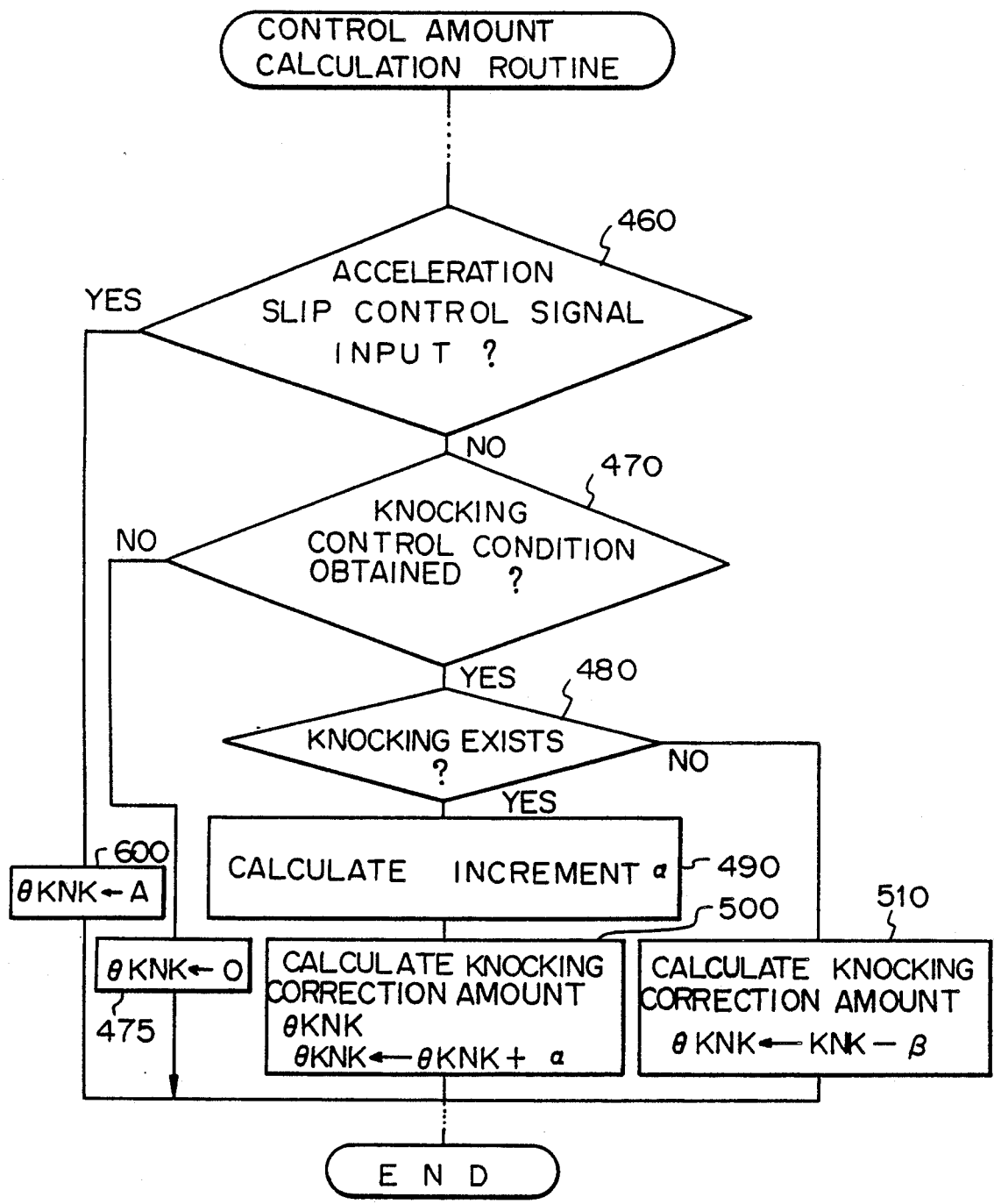

SLIP CONTROL SYSTEM FOR A VEHICLE PROVIDED WITH AN INTERNAL COMBUSTION ENGINE

BACKGROUND OF THE INVENTION

1. Field of the Invention

The present invention relates to a system for controlling slip generated at the drive wheels of a vehicle upon an acceleration thereof by controlling an output torque of an internal combustion engine.

2. Description of the Related Art

Various systems capable of controlling slip generated at the drive wheels of a vehicle upon acceleration, by controlling an output torque of an internal combustion engine, are known, and in one such system for reducing an output torque of an internal combustion engine, for example, a number of cylinders at which a fuel cut is carried out is varied in accordance with the degree of slip of the drive wheels during acceleration (see Japanese Unexamined Patent Publication No. 58-8436). Also, a system is known in which the ignition timing is delayed with respect to the optimum timing when acceleration slippage occurs (see Japanese Unexamined Patent Publication No. 62-67257).

Nevertheless, in addition to the system for controlling acceleration slippage, an automobile is usually provided with various control devices for controlling the engine in accordance with engine operating conditions, to obtain a high engine output and reduce vibration, etc., in the vehicle. Among these systems is a knocking control system provided for obtaining an effective output torque of an internal combustion engine, where an ignition timing is retarded with respect to the optimum timing upon detection of an occurrence of knocking, and is advanced with respect to the delayed timing when knocking is not detected, to thereby obtain an effective output power from the engine without the generation of knocking.

These slip and knocking controls of the prior art are carried out independently in line with respective requirements, an therefore, the following difficulty arises. When a knocking control is carried out, and simultaneously acceleration slippage is generated in the drive wheels due to a depression of an accelerator pedal by a driver, a control of the engine output torque as required by the knocking control system and a control of an engine output torque as required by the slip control system occur simultaneously and often are contradictory. Accordingly, a situation can arise wherein the slip control system operates to reduce the engine output torque, while the ignition control system operates to increase the engine output, which causes the control of the slippage to be worsened, i.e., a desired acceleration of the vehicle cannot be obtained because the slippage is not controlled. For example, where the control of the engine output torque is carried out by using a fuel cut operation at a specific cylinder(s), a retarding of the ignition timing or a closing of a subthrottle valve, or a change in the selected number of cylinders, the degree of retarding of the ignition timing or degree of opening of the throttle valve as calculated in accordance with the degree of slippage of the drive wheels is influenced and varied by the control of the ignition timing for controlling the knocking, which obviates an effective control of the slippage of the drive wheels.

Furthermore, vibration occurs in the engine under the fuel cut operation for lowering the engine output, and thus the knocking control system is sometimes erroneously operated. As a result, the delay control for suppressing the knocking and the delay control for suppressing the acceleration are combined, and thus the engine is operated under an extremely retarded ignition timing, which causes the engine output to be greatly reduced and lowers the acceleration performance.

SUMMARY OF THE INVENTION

An object of the present invention is to provide a slip control system for a vehicle, capable of overcoming the above-mentioned difficulty.

Another object of the present invention is to provide a slip control system for a vehicle, capable of suppressing and preventing knocking.

According to the present invention, a vehicle is provided, comprising: a vehicle body; drive wheels on the vehicle body; driven wheels on the vehicle body; an internal combustion engine in the vehicle body; a gear train for kinematically connecting the internal combustion engine to the driven wheels; said internal combustion engine comprising: an engine body having a plurality of cylinders; spark plugs arranged for each of the cylinders; intake means for introducing air into the cylinders; exhaust means for removing resultant exhaust gas from the cylinders; fuel introducing means for introducing a fuel into the intake means for defining a combustible mixture to be introduced into the cylinders; means for controlling an amount of fuel to be introduced into the intake means from the fuel introducing means for controlling the air-fuel ratio of the air-fuel mixture; means for controlling the ignition timing to a desired ignition timing; means, responsive to a knocking condition of the engine, for adjusting said desired setting of the ignition timing for suppressing an occurrence of the knocking in the engine; means for detecting the speed of the drive wheels of the vehicle; means, based on the detected value of the drive wheel speed, for detecting slippage at the drive wheels when the vehicle is accelerated; means, based on the detected slippage at the drive wheels, for allowing a setting of the torque applied to the drive wheels to be reduced for suppressing the occurrence of slippage during the acceleration of the vehicle and means for cancelling the operation of the knocking control means so that the control of the ignition timing based on the engine knocking condition is stopped during the operation of said torque control means.

BRIEF DESCRIPTION OF THE DRAWINGS

FIGS. 1A and 1B are two sheets of a schematic general view of a vehicle fitted with a slip control system according to the present invention;

FIGS. 2A to FIG. 2C are three sheets of flow chart of the operation of the control circuit 4 for control of acceleration slip in FIG. 1;

FIGS. 5 and 6, respectively, partially show an engine control amount calculation routine in second and third embodiments of the present invention.

DESCRIPTION OF THE PREFERRED EMBODIMENTS

Figure 1A:
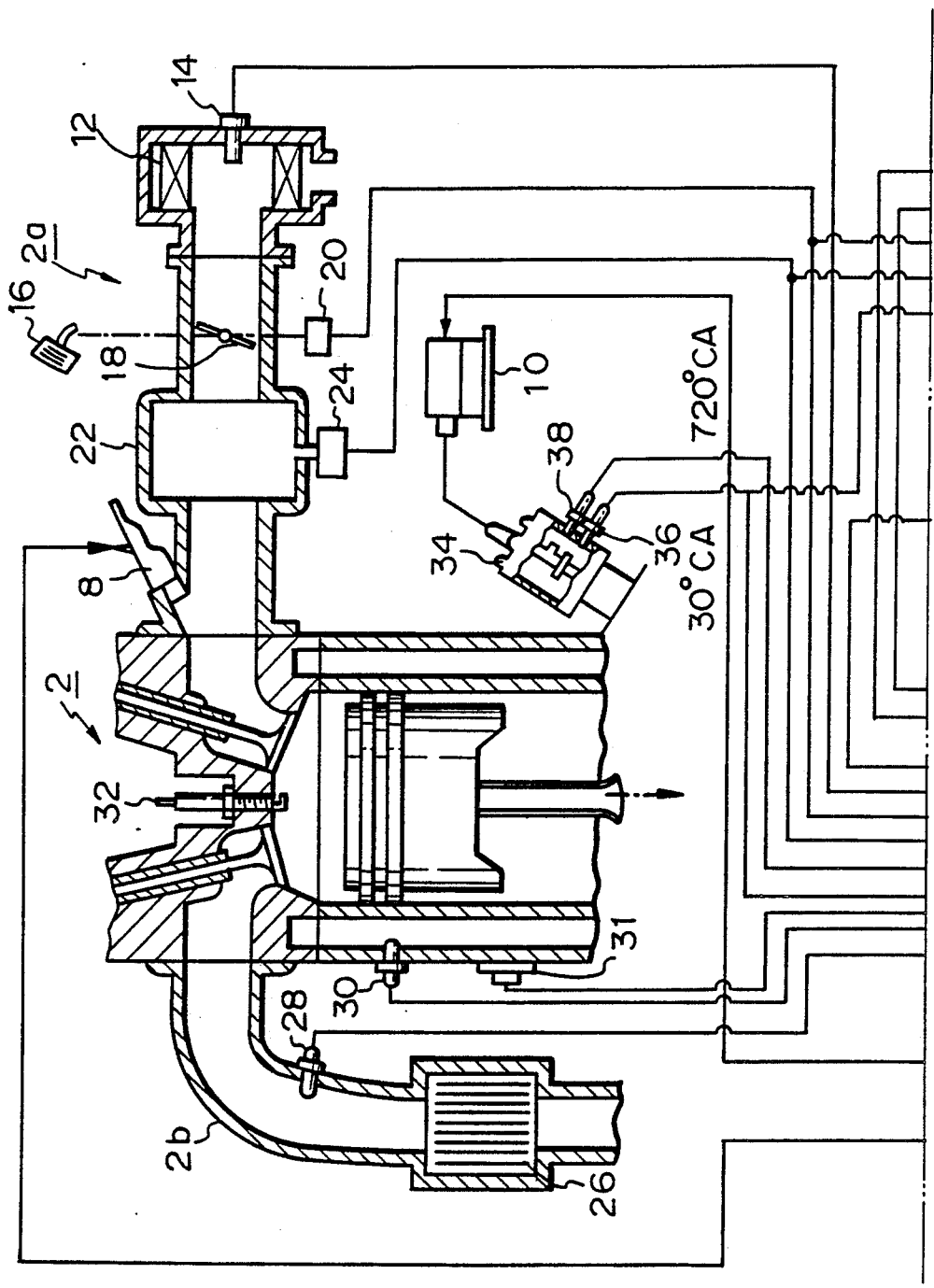

Embodiments of the present invention will be described with reference to the attached drawings. FIG. 1A-1B schematically shows an FR (Front Engine-Rear Drive) type vehicle provided with a four cylinder internal combustion engine 2, to which a traction control system according to the present invention is provided.

The traction control system according to the present invention is provided with a slip control circuit 4 for detecting slippage generated at the drive wheels of the vehicle upon the execution of an acceleration, calculating a control amount for suppressing an engine output torque in accordance with a magnitude of the slippage, such as the number of cylinders which are subjected to a fuel cut operation and the amount of retarding of an ignition timing upon the occurrence of the acceleration slippage, and outputting data indicating the result of the calculation. The system is further provided with an engine control circuit 6 for receiving the signal output from the slip control circuit 4, and executing the designated fuel cut operation and ignition timing retarding control operation to reduce the engine output torque for suppressing the slippage at the drive wheels of the vehicle.

As is well known, the engine control circuit 6 is a microcomputer system provided with a CPU 6a, ROM 6b and RAM 6, and further, has an input interface 6d for receiving signals from various sensors for detecting various operating conditions of the engine, and data for controlling the acceleration slip from the slip control circuit 4, to allow the control circuit 6 to execute designated calculations for determining a fuel injection amount and ignition timing in the engine 2, and furthermore, has an output interface 6e for outputting signals resulting from the calculation for controlling the operation of the fuel injectors 8 provided in respective cylinders of the engine, and the ignitor 10 for controlling the ignition timing.

For the detection of various engine operating conditions, an air temperature sensor 14 is located adjacent to an air cleaner 12 for detecting the temperature of air introduced into an intake passageway 2a of the engine, a throttle sensor 20 is connected to a throttle valve 18 connected to an accelerator pedal 16 for detecting the degree of opening of the throttle valve 18, and mounted in a surge tank 22 for a suppression of pulsations of an intake pressure in the intake pipe 2a is an intake pressure sensor 24 for detecting the intake pressure. An air-fuel ratio sensor 28 for detecting a density of oxygen in an exhaust gas is arranged in an exhaust passageway 2b at a position upstream of a three-way catalytic converter 26 for cleaning the exhaust gas, a temperature sensor 30 is connected to an engine body for detecting a temperature of the cooling water, a knocking sensor 31 is mounted on the engine body for outputting signals indicating mechanical vibration of the engine, which indicates a degree of knocking of the engine, a first crank angle sensor 36 is mounted to a distributor 34 and outputs a pulse signal for every 30 degrees rotation of a crankshaft of the engine and a second crank angle sensor 38 is mounted to the distributor for outputting a pulse signal for every 720 degrees rotation of the crankshaft, i.e., one complete engine cycle. These signals from the sensors as described are input to the engine control circuit 6 via the input interface 6d.

The acceleration slip control circuit 4 which is a microcomputer unit similar to the engine control circuit 6, is provided with a CPU 4a, ROM 4b and RAM 4c, and further, has an input interface 4d for inputting the signals as detected by the throttle sensor 20, the intake pressure sensor 24, and crank angle sensor 36 as already explained, as well as signals from sensors 42FL and 42FR for detecting the rotational speed of left and right non-drive wheels 40FL and 40FR, respectively, and sensors 42RL and 42RR for detecting the rotational speed of left and right drive wheels 40RL and 40RR, respectively. Based on these input signals indicating the degree of slip generated in the vehicle, the slip control circuit 4 executes a calculation of the control amount for controlling the output torque of the engine, and is further provided with an output interface 4e for outputting the calculated data to the engine control circuit 6.

The vehicle is provided with an output gear train for connecting the crankshaft 2c of the engine 2 to the rear drive wheels 40RL and 40RR via an automatic transmission device 44 and a differential gear 46. The automatic transmission device 44 includes a torque converter provided with a lock up clutch for obtaining a direct connection mode between the input and output sides thereof. The automatic transmission 44 is further provided with a fluid pressure control unit (not shown) for controlling an inner pressure level in the unit, to control the gear ratio of the transmission or operation of the lock-up clutch mechanism.

The operation of the system according to the present invention and realized by the acceleration slip control circuit 4 and engine control circuit 6 for fuel injection and ignition timing will be described with reference to the attached drawing.

Figure 2C:
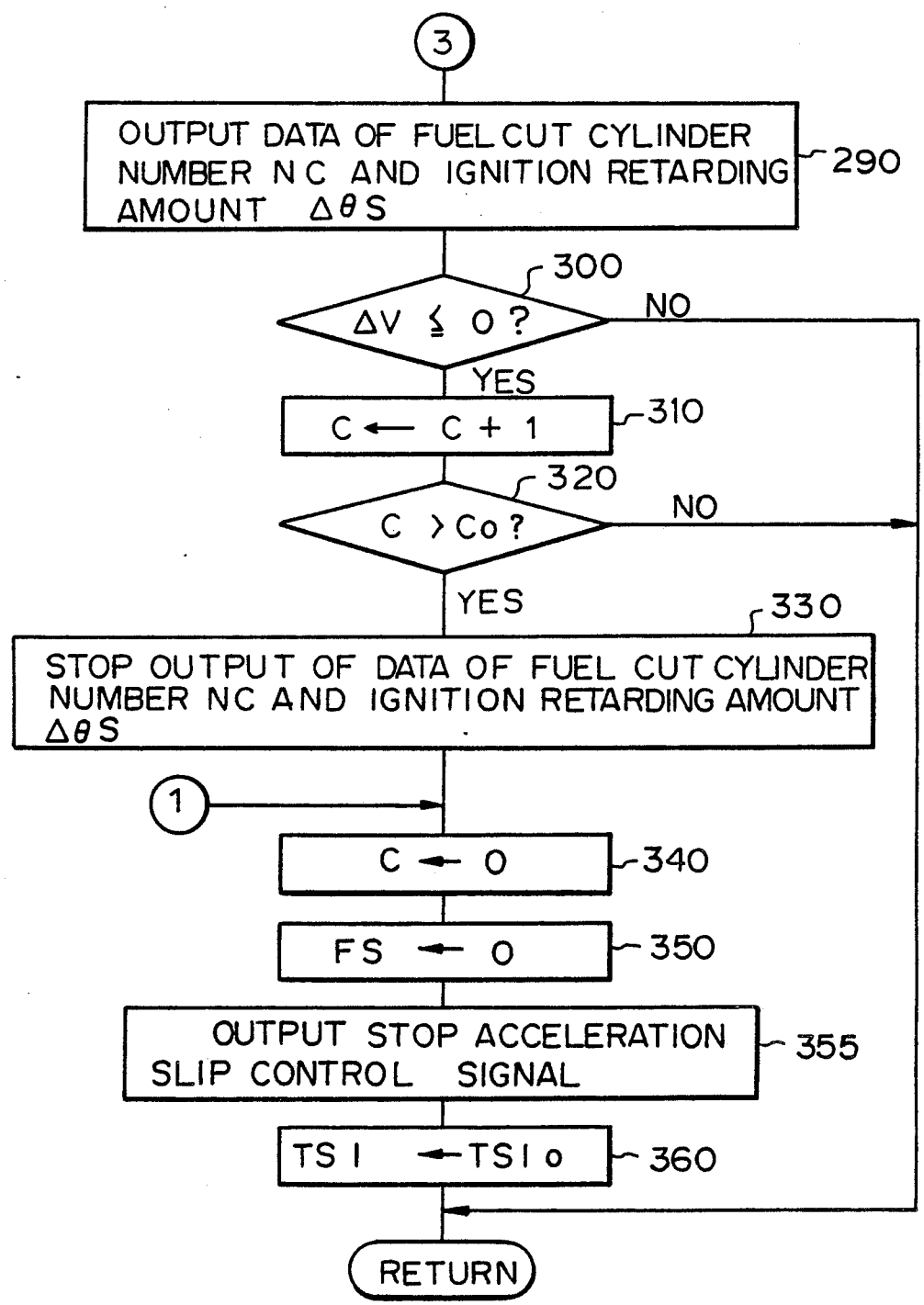

FIG. 2 shows a routine for executing a control of an acceleration slip, as carried out by the control circuit 4. This routine is calculated at predetermined intervals of a few milliseconds. At step 110, a drive wheel speed VR and a vehicle speed VF are calculated, respectively. To determine the drive wheel speed VR, first a speed VRL of the left drive wheel 40RL is detected by the left drive wheel sensor 42RL and a speed VRR of the right drive wheel 40RR is detected by the right drive wheel sensor 42RR. Next, an average value of the detected driving speed values VRL and VRR is determined as the driving speed VR. To determine the vehicle speed VF, first a speed VFL of the left non-drive wheel 40FL is detected by the left non-drive wheel sensor 42FL and a speed VFR of the right non-drive wheel 40FR is detected by the right non-drive wheel sensor 42FR. Then an average value of the detected non-drive wheel speed values VFL and VFR is determined as the vehicle speed VF.

At step 120, a target value of a slip $V_0$ of the drive wheels 40RL and 40RR is calculated from the vehicle speed VF obtained at step 110, and multiplied by a target slip ratio Ks having a predetermined value, such as 0.1. At step 130, an actual slip value VJ of the drive wheels 40RL and 40RR is calculated by the drive wheel speed VR subtracted by the vehicle speed VF. At step 140, a deviation $\Delta V$ is calculated from the actual slip VJ subtracted from the target slip $V_0$.

At step 150, it is determined if an acceleration slip control flag FS has been reset. This flag is set when an acceleration slip control is carried out. When the flag FS is zero, i.e., the acceleration slip control is not under operation, the routine flows to step 160, where it is determined if the deviation $\Delta V$ between the actual slip VJ and the target slip V₀ is larger than zero, i.e., an acceleration slip in the drive wheels 40RL and 40RR has occurred.

When ΔV is larger than zero, it is determined if the acceleration slip has been generated in the drive wheels 40RL and 40RR. In this case, the routine goes to step 170, where the flag FS is set, and then to step 180 where a signal is issued to the engine control circuit 6, which signal indicates that an acceleration slip control is being executed. When D≦0, it is determined that there is no occurrence of the slip at the drive wheels 40RL and 40RR, and the routine goes to steps below 340, as described later.

After the signal indicating the execution of the acceleration slip control is issued at step 180, or it is determined that the flag FS is set at the step, 150, the routine goes to step 190 where the mean drive wheel speed VR₀ of the left and right drive wheels 40RL and 40RR is calculated based on the values detected by the left and right wheel speed sensors 42RL and 42RR, and an engine rotational speed NE and intake pressure PM are calculated based on the values detected by the crank angle sensor 36 and the intake pressure sensor 20, respectively. At the following step 200, based on the engine speed NE and the average driving wheel speed VR₀ obtained at step 190, a reduction ratio γ (=NE/VR₀) in a power transmission train from the engine 6 to the driving wheel 40RL and 40RR is calculated.

At step 210, from an old value of an integral term TSI (old) in a target drive wheel torque, the deviation value ΔV multiplied by a predetermined integral factor GI is subtracted to obtain a new value of the target integral term TSI (new) in the drive wheel torque. Namely, $$TSI \text{ (new)} = TSI \text{ (old)} - GI \times \Delta V \tag{1}$$

At step 220, a proportional term TSP in the target drive wheel torque is calculated by the following equation (2).

$$TSP = -GP \times \Delta V.$$

At step 230, a target drive torque TS is calculated from the integral term TSI of the target drive torque and the proportional term TSP of the target drive torque obtained at steps 210 and 220, respectively. At the following step 240, the target drive torque (engine output torque) TS obtained at step 230 is divided by the transmission ratio γ to obtain an engine output torque TE for driving the drives wheel 40RL and 40RR under the calculated target drive torque TE. At step 250, based on the engine speed NE and intake pressure PM obtained at step 190 and a data map of the torque between the engine speed and the intake pressure, the maximum engine torque TMAX is calculated, as obtained when the fuel injection is carried out at all of the cylinders of the engine. At step 260, based on the maximum engine torque TMAX and the target engine torque TS, the number NC of the cylinder(s) for executing a fuel cut operation to control the engine output torque to the target torque TE for controlling acceleration slip is calculated by using the following equation.

$$C = INT(KC(1 - TE/MAX))$$

where KC is the total number of cylinders (four in this embodiment), and INT is the integer obtained by rounding-off the calculated value of the bracketed term.

At step 270, based on the engine speed NE and intake pressure PM obtained at step 190, as well as a data map, the ratio of the reduction in engine torque TCA is calculated, which reduction in the amount of the engine torque is obtained when an ignition timing of the engine is delayed for one degree of the crank angle. At step 280, based on the target engine torque TE, the maximum engine torque TMAX, the number of the cylinders NC for executing the fuel cut, and an amount of delay in the ignition timing (delay amount during an acceleration slip) θS is calculated by the following equation, which is the amount of the delay in the ignition timing for controlling the output torque of the engine 2 to the target torque TE when the number of cylinders NC is subjected to a fuel cut operation during the occurrence of slippage upon an acceleration.

$$\Delta \theta S = \left(1 - \frac{TE}{MAX} \times \frac{KC}{KC - NC}\right)\frac{1}{TCA} \tag{4}$$

After the number NC of the cylinders subjected to the fuel cut for controlling the slippage during an acceleration and the amount delay ΔθS in the ignition timing are calculated, the routine goes into a step 290, where the calculated control data (NC and ΔθS) are output to the engine control circuit 6. Then the control circuit 6 carries out a fuel cut operation and the retarding operation of the ignition timing upon the generation of the acceleration slip of the vehicle, so that the output torque of the engine 2 is reduced to suppress the slip. When the control data for controlling the acceleration slippage is output to the control circuit 6 at step 290, the routine goes to step 300, where it is judged if the deviation ΔV of the actual amount of slip VJ from the target slip amount V₀ is smaller than zero, i.e., the acceleration slip is controlled. If it is judged that ΔV>0, then the following steps are by-passed, since it is considered that the acceleration slippage is continued. When it is determined that ΔV>0, the routine goes to step 310, where a counter C for measuring the duration time of a condition wherein ΔV≦0 is incremented, and then the routine goes to step 320.

At step 320, it is determined if the value of the counter exceeds a predetermined number CO, i.e., a predetermined time has lapsed while ΔV is equal to or smaller than zero. When "NO" at step 320, the routine started by step 330 is bypassed to return to a main routine, whereby an acceleration slip control according to the present invention is still continued. A result at step 320 means that an acceleration slip in the drive wheels 40RL and 40RR has not occurred, and therefore, the routine goes to step 330, where the output of the signals of the data of the number of fuel cut cylinders NC and the amount of ignition retarding ΔθS to the engine control circuit 6 is stopped. At step 340 the counter C is cleared, at step 350 the flag FS is cleared, at step 355 an output of the acceleration slip control executing signal is stopped, and at step 360 an initial value TSI₀ of the integral term in the target drive torque is moved to the TSI. These steps 340 to 360 are preparation for the following acceleration control. It should be noted that this initializing process at steps 340 to 360 is carried out when, at the step 160, it is determined that the deviation ΔV of the actual slip amount VJ to the target slip amount $V_0$ is equal to or smaller than zero, i.e., there is no occurrence of slip at the drive wheels 40RL and 40RR.

A routine for controlling the engine control amount to control the fuel injection and the ignition timing, executed at the engine control circuit 6, will be explained with reference to FIG. 3. This routine is repeatedly executed in the engine control circuit 6 after the start of the engine 2. At step 400, a map interpolation calculation of a basic fuel injection amount $\tau_0$ is carried out based on the detected engine speed NE and detected intake pressure PM. At the following step 410, various fuel correction amounts and factors, known per se, such as for warming up correction and air-fuel ratio correction, are calculated based on signals from the intake air temperature sensor 14, air-fuel ratio sensor 28, and engine cooling water temperature sensor 30. At step 420, a target fuel injection amount $\tau$ from the fuel injector 8 is calculated from the basic fuel injection amount $\tau_0$ obtained at step 400, and multiplied by a varied fuel injection correction amount $K\tau$. This calculated fuel injection amount $\tau$ is stored in the RAM 6C, which is used for controlling the opening of the fuel injector 8. After the fuel injection amount $\tau$ is calculated, the routine goes to step 450.

At step 450, a map interpolation calculation is carried out to obtain a basic ignition timing $\theta_0$ based on the engine speed NE and the intake pressure PM. At step 460, it is determined if a signal obtained at the step 180 in FIG. 2 has been output for executing the slip control upon acceleration, to reduce the engine torque. When it is determined that the signal for executing the acceleration slip control has been input, it is considered that the condition for attaining a acceleration slip control has been realized, and therefore, a knocking control routine realized by steps 470 to 512 is cancelled and the routine goes to step 520 and 530, as described later. When it is judged that the acceleration slip control signal has not been input, the routine goes to step 470, where it is determined if a knocking control condition has been obtained. This determination is carried out by determining if the engine cooling water temperature THW sensed by the cooling water temperature sensor 30 is higher than a predetermined value and if the ratio of the intake air amount to the engine speed Q/NE as the engine load parameter is larger than a predetermined value. When it is determined that the knocking control condition has not been obtained, the routine goes to step 472 to clear the KCS, and to step 475 at which a zero value is moved to the ignition timing delay correction amount $\theta$KNK. When it is determined that the knocking control condition has been obtained, the routine goes, via step 471, 474 and 476, as a learning routine, to the routine below step 480.

At step 480, it is determined if knocking has occurred in the engine by using a knocking determination routine (not shown) which is per se known, and which determines an occurrence of a knocking based on a signal from the knocking sensor 31. When it is determined that knocking has taken place, the routine goes to step 490, where an increment amount $\alpha$ for calculating the knocking delay correction amount $\theta$KNKin is calculated in accordance with the intensity in the knocking detected by the knocking sensor 31. At the following step 500, a knocking correction amount $\theta$KNK is updated by adding the increment a to the old value of $\theta$KNK. In other words, the ignition timing is retarded with respect to the optimum timing by increasing the knocking correction amount $\theta$KNK when the knocking takes place.

When it is determined that knocking has not taken place at step 480, the routine then goes to step 510, where a knocking correction amount $\theta$KNK is updated by subtracting a predetermined decrement amount $\beta$ from the old value of $\theta$KNK. In other words, the ignition timing is advanced toward the optimum timing by decreasing the knocking correction amount $\theta$KNK when the knocking has not taken place. At step 512, the value of $\theta$KNK is moved to $\theta$KNKB for storing the date of the correction amount during the preceding knocking control operation cycle, and will be used for carrying out the learning control operation.

The learning control of the correction amount will be described when it is determined that the engine is under the knocking control condition at the step 470, the routine goes to step 471, where it is determined if the flag KCS is set (1). This flag is set when the engine goes into the knocking control condition where the ignition timing retarding amount $\theta$KNK is controlled in accordance with the signal from the knocking sensor as realized by the step 500 or 510, and reset when the engine is not under the knocking control. When it is determined that the flag KCS=0, this means that the engine has just entered the knocking control condition from the non-knocking control condition. Then the routine goes to step 474, where the value stored in $\theta$KNKB for storing the ignition timing delay amount obtained at the preceding knocking control routine (see step 512) is moved to $\theta$KNK. In other words, the latest value of the delay correction amount during the preceding knocking control routine is used as the initial amount of the knocking delay amount when the engine first goes into the knocking control routine. Namely, the initial value of the delay correction amount is moved from a value of zero (step 475) to a not zero value $\theta$KNKB (step 512). As a result of this "learning" control of the ignition delay amount, a very quick control to the desired value of the ignition delay amount is obtained. At step 476, a value of 1 is moved to the KCS.

When it is determined that KCS=1, step 474 is by-passed.

When it is determined that the engine has left the knocking control condition at step 470, this flag KCS is cleared at step 472.

To determine if knocking has occurred at step 470, it is determined whether the consecutive number of the state where the signal level from the knocking sensor 31 is larger than a predetermined value is larger than a predetermined number. This method of a determination of the occurrence of a knocking is per se well known, and therefore, a detailed explanation thereof will be omitted.

When the knocking delay amount $\theta$KNK for a knocking control has been calculated at steps 500 and 510, the routine goes to step 512 where the value of the $\theta$KNK is moved to $\theta$KNKB, which as already explained is used to calculate the knocking delay amount when the engine state changes from the condition wherein the knocking control is not carried out to the condition wherein the knocking control is carried out (step 474).

At step 520, a varied ignition timing correction amount $\theta$X other than the knocking correction amount $\theta$KNK is calculated. This step 520 is carried out after step 460 when a knocking control is not carried out due to the input of the acceleration slip control signal, or after step 475 or 512 when the program then goes to step 520 at which the knocking control is carried out. As is well known, the ignition timing retarding correction at step 520 includes, for example, a warming up correction for advancing the ignition timing when the temperature of the engine cooling water THW is low, a high temperature correction for advancing or retarding the ignition timing when the temperature of the engine cooling water THW during an engine idling condition is high, and an idling speed correction for advancing the ignition timing when the idling speed NE of the engine during the idling condition is lower than a target value in accordance with the deviation of the engine speed, etc. At step 530, a final ignition timing $\theta$ is calculated based on the basic ignition timing $\theta_0$ obtained at step 450, the varied correction amount $\theta X$ obtained at step 520, the knocking delay correction amount $\theta KNK$ obtained at step 475, 500 or 510, and the acceleration delay amount during the slip control $\theta S$ obtained at step 280 in FIG. 2. Namely, the ignition timing $\theta$ is calculated by $$\theta = \theta_0 + \theta X - \theta KNK + \Delta\theta S.$$

Figure 3A:
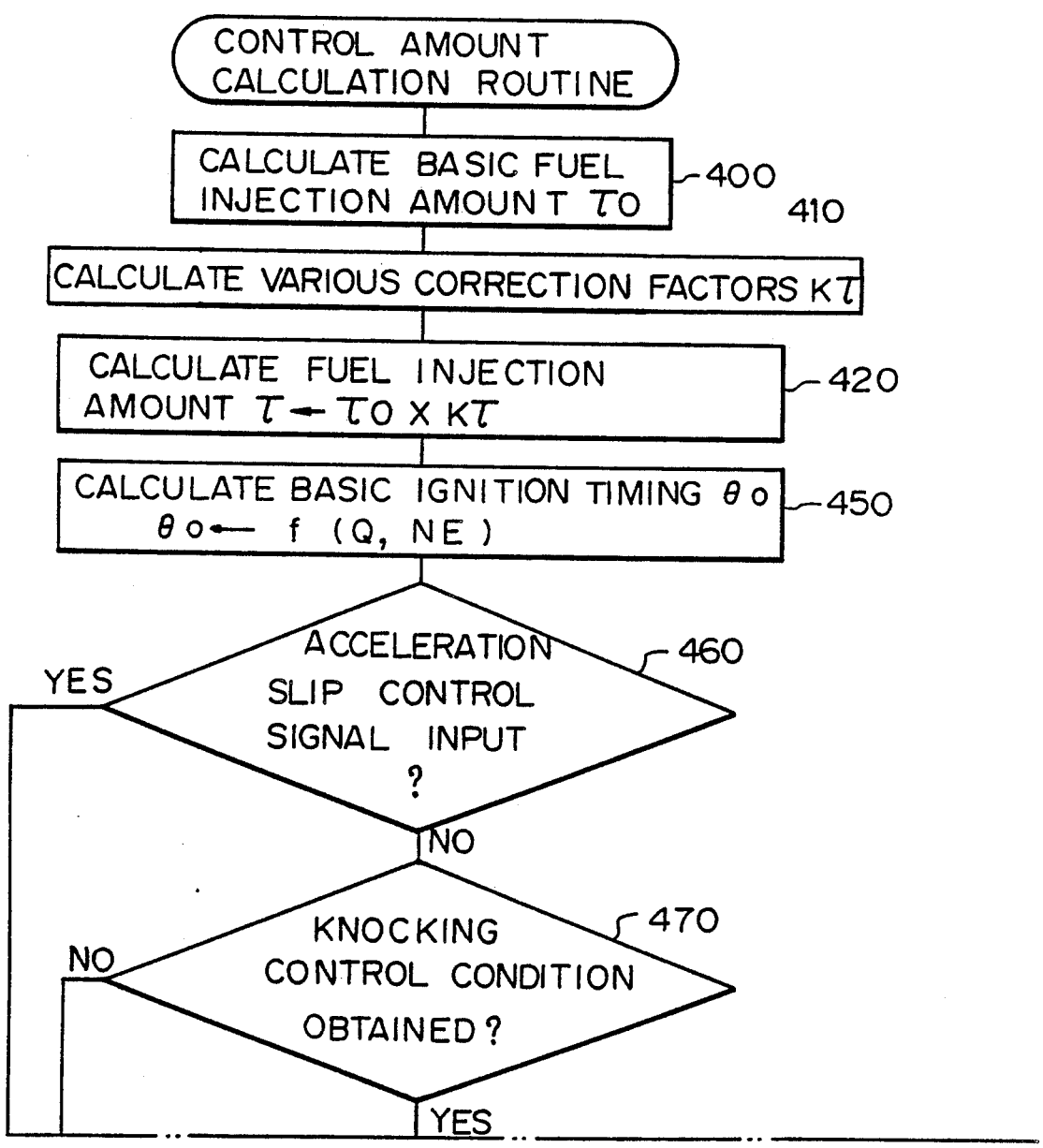
FIGS. 3A and 3B are two-sheets of a flow chart of the operation of the engine control circuit 6 of FIG. 1.
Figure 3B:
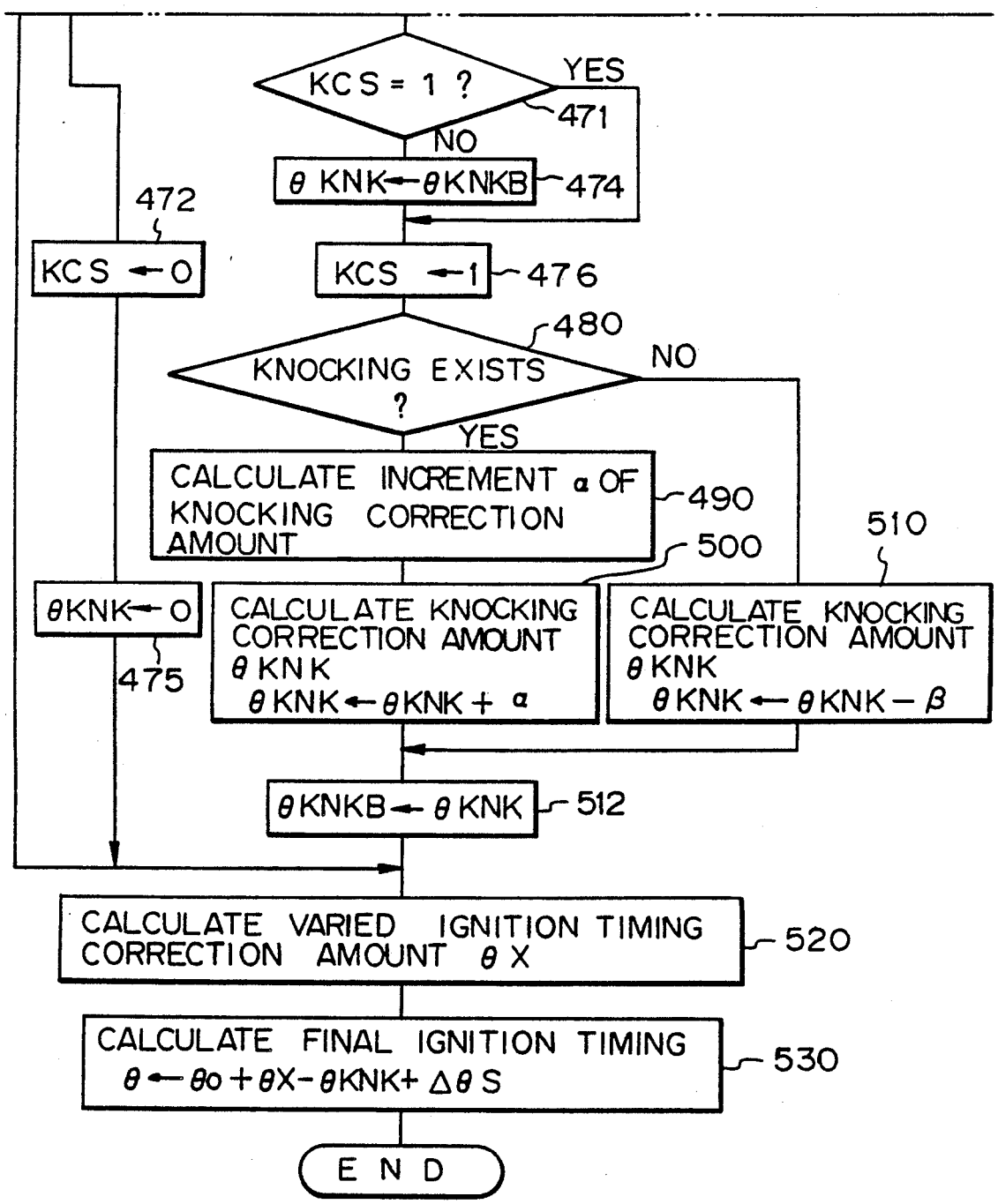
Figure 4A:
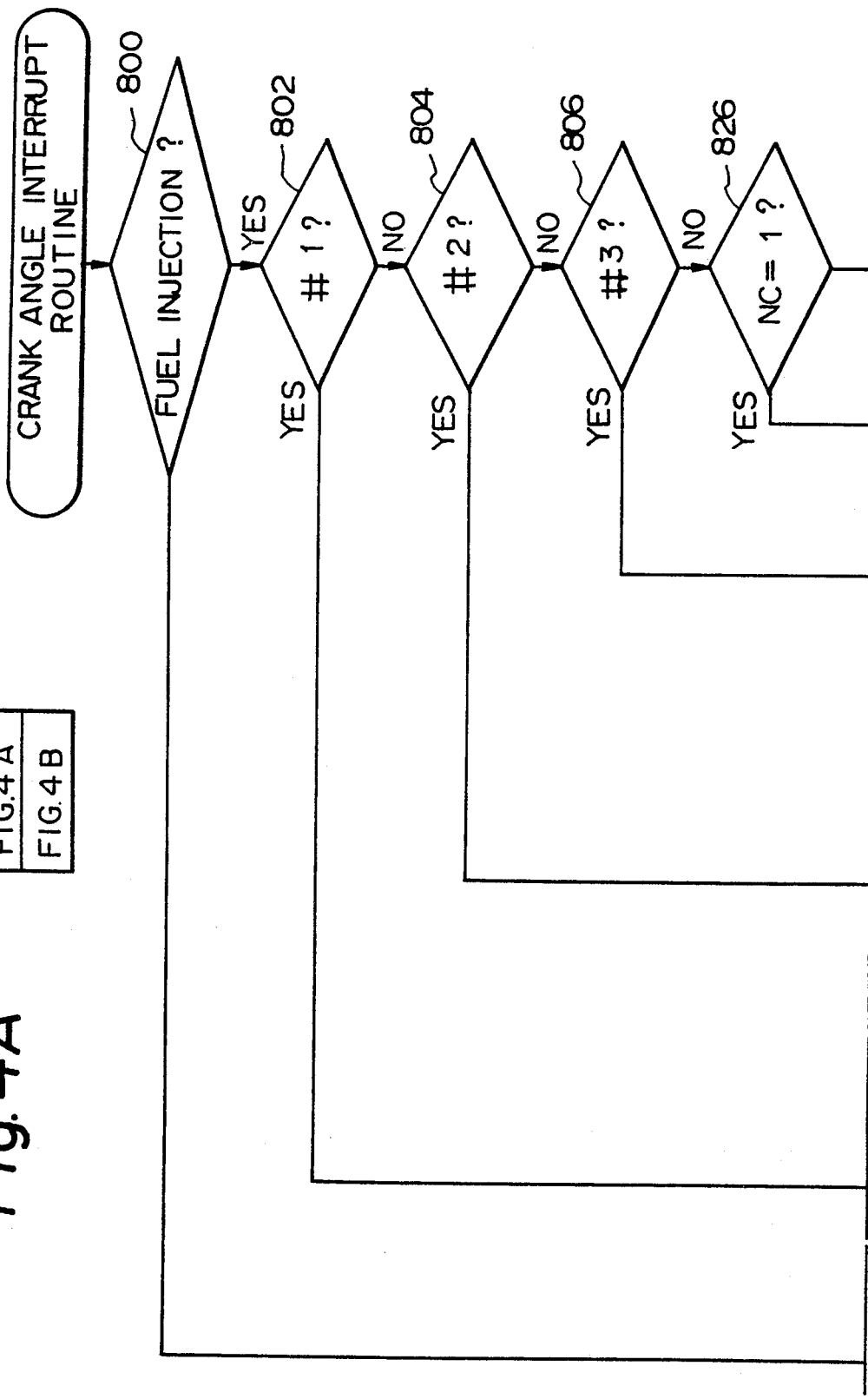
FIGS. 4A and 4B are two sheets of a flow chart of the operation of a routine for executing control of fuel injection and ignition timing.
Figure 4B:
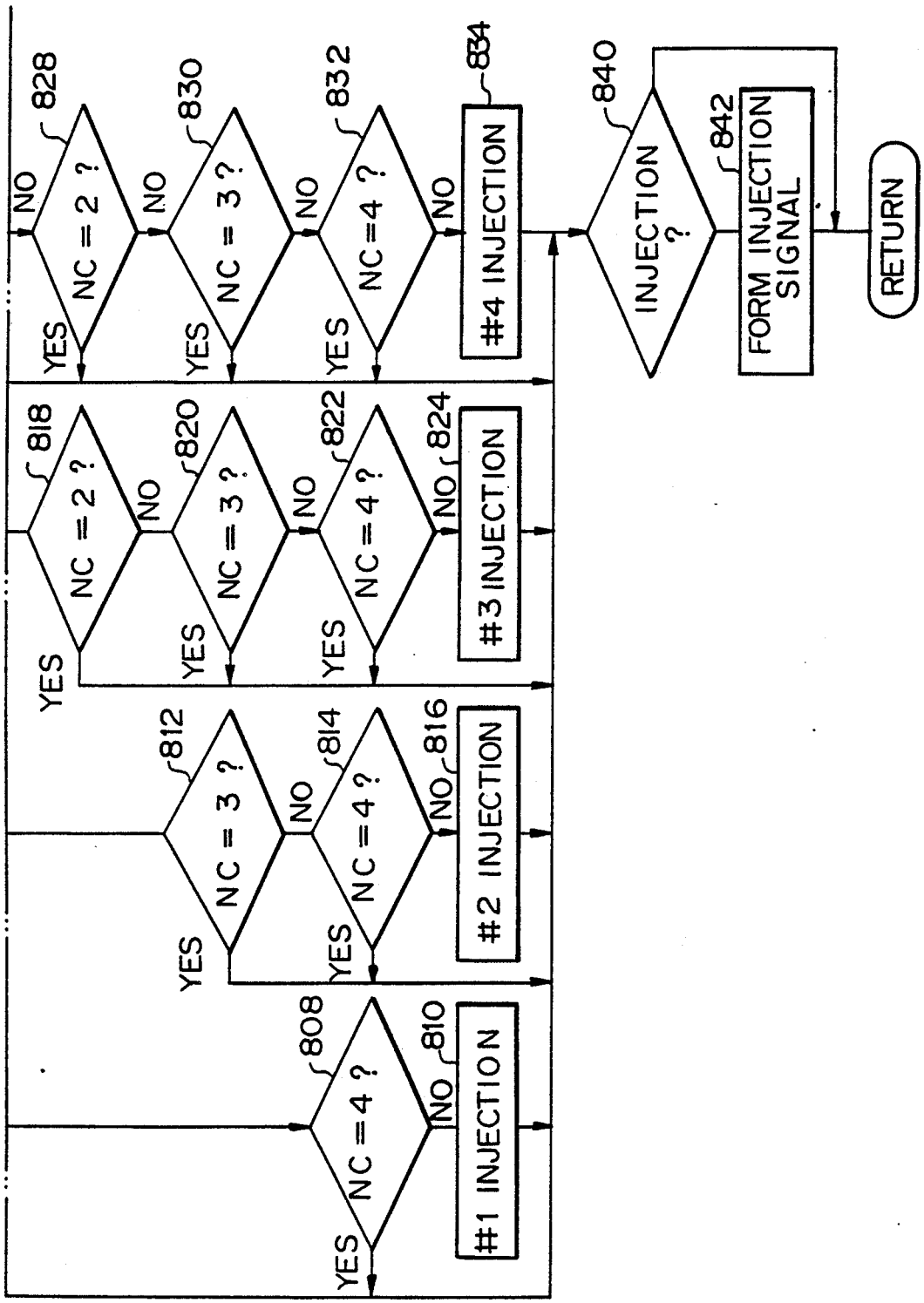

FIG. 4 shows a routine for executing the control of the fuel injection and the ignition timing. This routine is commenced at the output of a 30 degrees crank angle signal from the first crank angle sensor 36. At step 800, it is determined if timing is that for producing a fuel injection signal for a cylinder; this timing occurring once for each cylinder. Namely, this timing occurs at every 180 degrees of crank angle when the engine is a 4 cylinder type or at every 120 degrees of crank angle when the engine is a 6 cylinder type. The explanation hereinbelow is of an engine of the 4 cylinder type. At step 802 it is determined if this timing is that for an injection of the first cylinder, at step 804 it is determined if this timing is that for an injection of the second cylinder, and at step 806 it is determined if this timing is that for an injection of the third cylinder. When it is determined that it is the timing for operating the first cylinder injector 8, the routine goes, via a step 808 described later, to step 810 whereat a process is carried out by which the first cylinder injector 8 is opened for a period corresponding to the fuel injection amount $\tau$ calculated at step 420 in FIG. 3. At step 808 it is determined if the number NC of the cylinder to be subjected to the fuel cut is 4. When NC=4, i.e., all of the cylinders should be subjected to the fuel cut, the routine at step 810 is bypassed and the fourth cylinder is subjected to the fuel cut.

When it is determined that it is the timing for operating the second cylinder injector 8 at step 804, the routine goes, via steps 812 and 814 described later, to step 816 whereat a process is carried out by which the second cylinder injector 8 is opened for a period corresponding to the fuel injection amount $\tau$ calculated at step 420 in FIG. 3. At step 812, it is determined if NC=3, and at step 814 it is determined if NC=4. When NC=3 or NC=4, the step 816 is bypassed. In other words when NC=3 or NC=4, the second cylinder is subjected to a fuel cut.

When it is determined that it is the timing for operating the third cylinder injector 8 at the step 806, the routine goes, via steps 818, 820 and 822 described later, to step 824 whereat a process is carried out by which the third cylinder injector 8 is opened for a period corresponding to the fuel injection amount $\tau$ calculated at step 420 in FIG. 3. At step 818, it is judged if NC=2, at step 820 it is judged if NC=3, and at step 822 it is judged if NC=4. When NC=2 or NC=3 or NC=4, step 824 is bypassed. In other words, when NC=2 or NC=3 or NC=4, the third cylinder is subjected to a fuel cut.

When it is determined that it is the timing for operating the fourth cylinder injector 8 at step 806, the routine goes, via steps 826, 828, 830 and 832 described later, to step 834 whereat a process is carried out by which the fourth cylinder injector 8 is opened for a period corresponding to the fuel injection amount $\tau$ calculated at step 420 in FIG. 3. At step 826 it is judged if NC=1, at step 828, it is judged if NC=2, at step 830 it is judged if NC=3, and at step 832 it is judged if NC=4. When NC=1 or NC=2 or NC=3 or NC=4, step 834 is bypassed. In other words, when NC=1 or NC=2 or NC=3 or NC=4, the fourth cylinder is subjected to a fuel cut.

The routine in FIG. 2 operates to calculate the number NC of the cylinder to be subjected to the fuel cut cooperation when slip occurs during the acceleration of the vehicle at step 260 in FIG. 2. When the value of the number NC is 1, only the fourth cylinder is subjected to the fuel cut (YES determination at step 826); when the value of the number NC is 2, the third and the fourth cylinders are subjected to the fuel cut (YES determination at steps 818 and 828); when the value of the number NC is 3, the second, third and the fourth cylinders are subjected to the fuel cut (YES determination at steps 812, 820 and 830); and when the value of the number NC is 4, the first, second, third and the fourth cylinders, i.e., all of the cylinders, are subjected to the fuel cut (YES determination at steps 808, 814, 822 and 832).

In FIG. 4, steps 840 and 842 schematically show an ignition timing control routine carried out during the 30 degrees crank angle interrupt routine. At step 840, it is judged if the crank angle detected by the number of the 30 degrees crank angle pulses from the first crank angle sensor 36, counted from the reference position as detected by the 720 degrees pulse from the second crank angle sensor, is the crank angle for attaining the calculation of the ignition timing. This timing is output in accordance with the number of cylinders during one engine complete cycle, i.e., 720 degrees of crank angle. In a four cylinder engine this timing is output at every 180 degrees of crank angle. At step 842, an ignition control signal is formed for calculating a timing for commencing the energization of the ignitor 10. When the energization of the ignitor 10 is stopped, a spark is generated at the spark gap of the spark plug 32 of the cylinder designated by the distributor 34 at the timing q calculated at step 530 in FIG. 3. Since these processes for attaining control of the ignition timing at the calculated timing are well known, a more detailed explanation thereof will be omitted.

As will be seen from the above explanation, when the slip control is carried out to prevent slip at the drive wheels during an acceleration (YES result at step 460), the routine for controlling the ignition timing to suppress knocking (step 470 to 512) is bypassed, and thus the value of the knocking correction amount $\theta KNK$ is maintained without change, whereby the ignition timing retarded by an angle $\Delta\theta S$ (step 280 in FIG. 2) is obtained. This is calculated so as to obtain the optimum ignition timing corresponding to the acceleration slip control condition of the engine. In other words, when acceleration slip occurs of the drive wheels, the ignition timing control for acceleration slip control is carried out to override or cancel the ignition timing control for knocking until the acceleration slip is reduced. As a result, a desired control of the ignition timing is obtained when the acceleration slip control is attained. Namely, an unnecessary change of the engine output torque is prevented, which will be otherwise generated by the slip control system, and thus the acceleration slip can be quickly suppressed to thereby maintain the desired performance of the engine upon acceleration. According to the present invention, the change in the engine torque during the knocking control, which is an error component for the acceleration slip control, does not affect the calculated result of the target engine torque TE (step 240 in FIG. 2) and the maximum torque (step 250 in FIG. 2), which allows the precision of the calculated torque to be improved and permits an increase of the precision of the control data for controlling the engine output torque, such as the number NC (step 260 in FIG. 2) of the cylinders subjected to the fuel cut and the ignition timing retarded correction amount $\Delta\theta S$ (step 280 of FIG. 2) during the acceleration slip control. As a result, a desired acceleration performance of the engine can be obtained.

In the above embodiment, the knocking control below step 470 in FIG. 3 is automatically cancelled when the acceleration slip control condition is obtained (YES result at step 460 of FIG. 3), and the knocking correction amount $\theta KNK$ obtained at step 500 or 510 just before the acceleration slip control is commenced is maintained. In this case, however, a situation may arise in that the value of the knocking correction amount $\theta KNK$ as maintained during the acceleration slip control is not proper for an effective control of knocking. Namely, the knocking correction amount $\theta KNK$ may have a value which is an extreme value in the range of variations of that value, i.e., the minimum (zero) value or maximum value. The minimum value is used to obtain the final ignition timing as a basic value without a retarding correction, and is usually obtained when the engine is under low load, just before stopping the knocking control operation and the maximum value is used to obtain the most-retarded ignition timing and is usually obtained when the engine is under high load just before stopping the knocking control. As is well known, at the minimum retarding of the ignition timing, the engine easily generates knocking, while at the maximum delay in the ignition timing, the engine easily loses its fuel economy characteristics. Therefore, the stored value of the minimum or maximum delay value during the stoppage of the knocking control can cause the engine to be subjected to knocking or worsen the efficiency thereof when the knocking control operation is recommenced. Namely, the acceleration slip control is to be carried out when the vehicle is accelerated, and when the vehicle is subjected to an acceleration, a situation may arise in that the knocking correction amount $\theta KNK$ has a value which does not correspond to the actual operating condition, due to a delay in the response of the knocking control. This improper value of the knocking delay amount $\theta KNK$ obtained when the acceleration is commenced is maintained during the acceleration slip control, and is used when the knocking control is recommenced after the acceleration slip is completed, and thus an ideal knocking control cannot be attained due to the improper initial value of knocking correction amount $\theta KNK$, and the driveability is worsened.

To obviate this difficulty, according to a second embodiment shown in FIG. 5, at step 460 of FIG. 3, when it is determined that the acceleration slip control condition is obtained, the routine goes to step 600, where a value A is moved to the knocking delay correction amount $\theta KNK$, which value is independent from the knocking delay amount obtained just before the acceleration slip control is commenced. As a result, the initial value of the knocking delay amount $\theta KNK$ becomes this value A when the knocking control is commenced after the completion of acceleration slip control.

Figure 6:
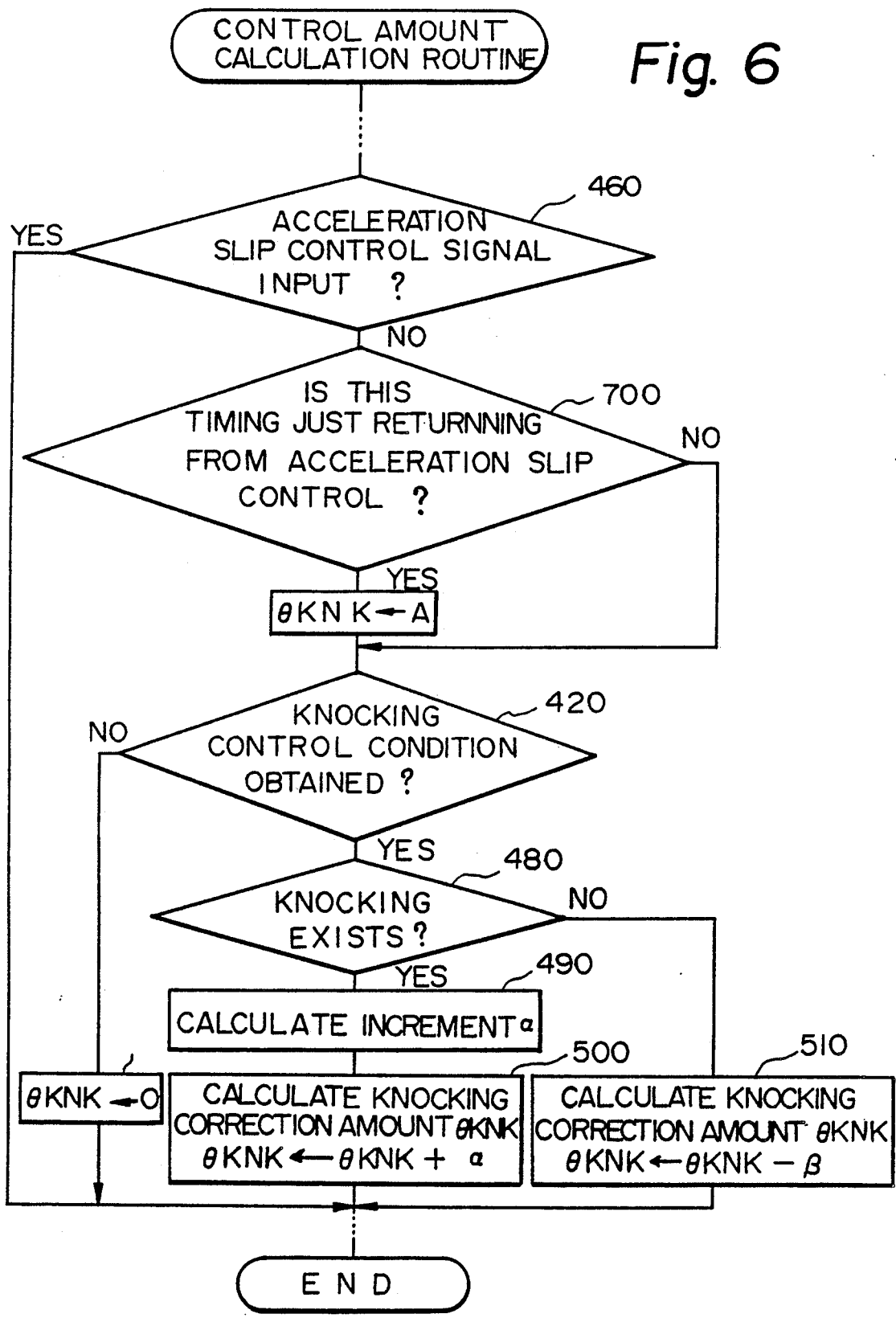

In another embodiment shown in FIG. 6, when it is determined that the acceleration slip control condition is obtained at step 460, the routine goes to step 700, where it is determined if the first cycle is carried out after returning from the acceleration slip control. When it is determined that this routine is the first routine after returning from the acceleration slip control, the routine goes to step 710 where at the value A is moved to the knocking delay correction amount $\theta KNK$. As a result, as in the embodiment of in FIG. 6, the initial value of the knocking delay amount $\theta KNK$ becomes this value A when the knocking control is commenced after the completion of acceleration slip control.

This starting of the knocking control from the value A, which is independent from the value of the knocking delay control amount $\theta KNK$, after the acceleration slip control, allows the knocking control to be effectively carried out just after the completion of the acceleration slip control.

This value A can be calculated in accordance with the operating conditions including the engine speed NE and the intake pressure PM. Alternatively, the value A can be a fixed value, such as a half of the maximum value of the knocking correction amount $\theta KNK$.

It should be noted that FIGS. 5 and 6 are substantially the same as FIG. 3, except for step 600 or 700 and 710.

In the above embodiment, the acceleration slip control signal is issued at step 180 in FIG. 2 from the acceleration control circuit 4 when an acceleration slip control condition is obtained, and the engine control circuit 6 operates to stop the knocking control when this signal is input (step 460 of FIG. 3). Alternatively, since the control of the output torque of the internal combustion engine 2 for controlling the acceleration slip control by the engine control circuit 6 is executed by the execution of control of the fuel cut or the ignition timing retarding control, which is operated by the output of the control signals $\Delta\theta S$ or NC (steps 260 and 280 in FIG. 2) from the slip control circuit 4 to the engine control circuit 6, it is possible to control the engine control circuit 6 so that the knocking control is executed when no data of the number of the cylinder NC to be subjected to the fuel cut or of the ignition timing retarding amount during the acceleration slip control $\Delta\theta S$ is input. Namely, the routine at step 460 in FIG. 3 can be changed to a step for determining if the NC data and $\Delta\theta S$ data are input. In this modification, a precise control of the engine output torque can prevent knocking while preventing acceleration slip.

Although the above embodiments are explained with reference to the device wherein both the control of the ignition timing and the control of the number of the cylinder subjected to the fuel cut are carried out for the acceleration slip control, the present invention can be applied to a device wherein the acceleration slip is precisely controlled by the degree of opening of the throttle valve, for controlling the amount of the intake air, or another device wherein these controls are combined to control the torque of the engine for a control of acceleration slip.

We claim:

1. A vehicle comprising:
a vehicle body;
drive wheels on the vehicle body;
non-drive wheels on the vehicle body:
an internal combustion engine in the vehicle body;
a gear train for kinematically connecting the internal combustion engine to the drive wheels;
said internal combustion engine comprising:
an engine body having a plurality of cylinders;
spark plugs arranged at each of the cylinders;
intake means for introducing air into the cylinders;
exhaust means for removing resultant exhaust gas from the cylinders;
fuel introducing means for introducing an amount of fuel into the intake means for defining a combustible air-fuel mixture to be introduced into the cylinders;
means for controlling the amount of fuel to be introduced into the intake means from the fuel introducing means for controlling the air-fuel ratio of the air-fuel mixture;
means for controlling the timing of a spark signal to each spark plug to obtain a desired ignition time;
means, responsive to a knocking condition of the engine, for adjusting said desired setting of the ignition timing for suppressing knocking in the engine;
means for detecting the speed of the drive wheels of the vehicle;
means, based on the detected value of the drive wheel speed, for detecting slippage of the drive wheels when the vehicle is accelerated;
means, based on the detected slippage at the drive wheels, for allowing a setting of the torque applied to the drive wheels to be reduced, to suppress slippage during an acceleration of the vehicle; and
means for cancelling the operation of the knocking control means so that a control of the ignition timing based on the engine knocking condition is stopped during the operation of said torque control means.

2. A vehicle according to claim 1, wherein said slip suppressing means comprise means for detecting a degree of slippage; means, based on the detected degree of slip, for calculating a target torque in accordance with the amount of engine torque to be reduced, and means for calculating a setting of an ignition timing correction amount for obtaining the target torque, whereby the ignition timing is set to this value when slippage occurs at the drive wheels.

3. A vehicle according to claim 2, wherein said slip control means further comprises means for calculating a number of cylinders to be subjected to a fuel cut operation upon the occurrence of acceleration slippage, and means for modifying the setting of the ignition timing correction amount in accordance with the calculated number of the cylinders to be subjected to the fuel cut.

4. A vehicle according to claim 1, further comprising means for setting a predetermined value of the knocking correction amount as an initial value of the knocking correction amount when the knocking control operation is recommenced upon completion of the acceleration slip operation, regardless of the value of the knocking correction amount during the preceding knocking control operation.

5. A vehicle according to claim 4, wherein said predetermined initial value is a variable value depending on engine operating conditions.

* * * * *

UNITED STATES PATENT AND TRADEMARK OFFICE
CERTIFICATE OF CORRECTION

PATENT NO. : 5,067,579
DATED : November 26, 1991
INVENTOR(S) : Naoto Kushi, et al It is certified that error appears in the above-identified patent and that said Letters Patent is hereby corrected as shown below:

| Column | Line | Corrections |
|---|---|---|
| 1 | 42 | Change "an" to --and--. |
| 1 | 59 | After "timing" insert --,-- and delete "or". |
| 2 | 57 | Before "2C" delete "FIG.". |
| 2 | 61 | Change "two-sheets" to --two sheets--. |
| 5 | 53 | Change "drives" to --drive--. |
| 7 | 35 | After "attaining" change "a" to --an--. |
| 12 | 19 | Change "where at" to --whereat--. |
| 12 | 21 | Before "FIG. 6" delete "in". |
| 13 | 28 | Change "ignition time" to --ignition timing-- |

Signed and Sealed this

Twenty-seventh Day of April, 1993

*Attest:*

MICHAEL K. KIRK

*Attesting Officer*  *Acting Commissioner of Patents and Trademarks*